US012125963B2

(12) United States Patent
Morisaku et al.

(10) Patent No.: US 12,125,963 B2
(45) Date of Patent: Oct. 22, 2024

(54) POWER STORAGE DEVICE

(71) Applicant: KABUSHIKI KAISHA TOYOTA JIDOSHOKKI, Kariya (JP)

(72) Inventors: Naoto Morisaku, Aichi-ken (JP); Hirokazu Kotake, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 702 days.

(21) Appl. No.: 17/294,323

(22) PCT Filed: Nov. 18, 2019

(86) PCT No.: PCT/JP2019/045147
§ 371 (c)(1),
(2) Date: May 14, 2021

(87) PCT Pub. No.: WO2020/105602
PCT Pub. Date: May 28, 2020

(65) Prior Publication Data
US 2022/0021018 A1    Jan. 20, 2022

(30) Foreign Application Priority Data

Nov. 19, 2018  (JP) .................................. 2018-216394
Nov. 12, 2019  (JP) .................................. 2019-204771

(51) Int. Cl.
  *H01M 10/04*   (2006.01)
  *H01M 10/36*   (2010.01)
  (Continued)

(52) U.S. Cl.
  CPC ....... *H01M 10/0481* (2013.01); *H01M 10/36* (2013.01); *H01M 50/204* (2021.01);
  (Continued)

(58) Field of Classification Search
  CPC ........... H01M 10/0481; H01M 50/204; H01M 50/262
  See application file for complete search history.

(56) References Cited

U.S. PATENT DOCUMENTS

2013/0157103 A1   6/2013  Osakabe et al.
2021/0143514 A1*  5/2021  Shaffer, II ............. H01M 50/54

FOREIGN PATENT DOCUMENTS

CN      108711635 A    10/2018
JP      2012-003869 A   1/2012
(Continued)

OTHER PUBLICATIONS

Translation of the Written Opinion of the International Searching Authority for International Application No. PCT/JP2019/045147 mailed Feb. 18, 2020.
(Continued)

*Primary Examiner* — Jonathan G Jelsma
(74) *Attorney, Agent, or Firm* — Sughrue Mion, PLLC

(57) ABSTRACT

A power storage device includes a pair of holding plates, several ribs and thin-walled portions. The ribs includes first ribs inclined to an extending direction of a first edge and an extending direction of a second edge and extending along straight lines connecting first engaging portions and second engaging portions, and second ribs extending along a facing direction in which the first edge and the second edge face each other. At least first ribs extend in different directions from each other and form an intersection where the at least two first ribs intersect with each other. At least one of the second ribs has opposite ends connected to the first ribs intersecting with each other.

9 Claims, 6 Drawing Sheets

(51) Int. Cl.
*H01M 50/204* (2021.01)
*H01M 50/262* (2021.01)
*H01G 11/10* (2013.01)

(52) U.S. Cl.
CPC .......... *H01M 50/262* (2021.01); *H01G 11/10* (2013.01); *H01M 2220/20* (2013.01)

(56) References Cited

FOREIGN PATENT DOCUMENTS

| | | | |
|---|---|---|---|
| JP | 2012-054053 | A | 3/2012 |
| JP | 2014-086141 | A | 5/2014 |
| JP | 2017-220357 | A | 12/2017 |
| JP | 2018-125124 | A | 8/2018 |

OTHER PUBLICATIONS

Translation of the International Search Report for PCT/JP2019/045147 mailed Feb. 18, 2020.
German Office Action dated Jul. 3, 2024 in Application No. 11 2019 005 787.1.

* cited by examiner

POWER STORAGE DEVICE

CROSS REFERENCE TO RELATED APPLICATION

This application is a National Stage of International Application No. PCT/JP2019/045147 filed Nov. 18, 2019, claiming priority based on Japanese Patent Applications No. 2018-216394 filed Nov. 19, 2018, and No. 2019-204771 filed Nov. 12, 2019, the contents of all of which are incorporated herein by reference in their entirety.

TECHNICAL FIELD

The present invention relates to a power storage device.

BACKGROUND ART

A power storage device having a plurality of power storage modules that are stacked has been known (e.g. Patent Document 1). In this power storage device, the plurality of power storage modules is held in a stacking direction by a pair of holding plates. In Patent Document 1, a plurality of connecting members is engaged with a plurality of engaging portions disposed along each of edges of the holding plates, and applies a load to the plurality of power storage modules in the stacking direction through the pair of holding plates.

CITATION LIST

Patent Document

Patent Document 1 Japanese Patent Application Publication No. 2018-125124

SUMMARY OF THE INVENTION

Technical Problem

When the power storage module is enlarged in an in-plane direction perpendicular to the stacking direction, the holding plates are also enlarged. Since weights of the holding plates increase as the holding plates are enlarged, there is a demand for a reduction of the weights of the holding plates. On the other hand, when the power storage module is enlarged in the in-plane direction, a distance from engaging portions of the holding plates to central positions of the holding plates increases. In this case, if thicknesses of the holding plates in the stacking direction are simply reduced to reduce the weights, the rigidities of the holding plates are reduced, and a load applied to the power storage modules from the connecting members through the holding plates is reduced. Therefore, there is a demand for securing a load applied to the power storage modules by the holding plates by securing the rigidities of the holding plates.

One aspect of the present invention provides a power storage device in which weights of holding plates are reduced while a load applied to power storage modules by the holding plates that holds the power storage modules is secured.

Solution to Problem

A power storage device according to one aspect of the present invention includes a plurality of power storage modules that are stacked, a pair of holding plates, and a plurality of connecting members. The pair of holding plates hold the power storage modules therebetween in a stacking direction. The plurality of connecting members connects the pair of holding plates, and applies a load to the plurality of power storage modules in the stacking direction through the pair of holding plates. Each of the pair of holding plates has a first edge and a second edge, and includes a plurality of first engaging portions and a plurality of second engaging portions. The first edge and the second edge face each other. The plurality of first engaging portions is disposed along the first edge, and some of the plurality of connecting members are engaged with the plurality of first engaging portions. The plurality of second engaging portions is disposed along the second edge, and some of the plurality of connecting members are engaged with the plurality of second engaging portions. At least one of the pair of the holding plates has a plurality of ribs and a plurality of thin-walled portions. The plurality of thin-walled portions is defined by the plurality of ribs and has a thickness in the stacking direction smaller than that of the plurality of ribs. The plurality of ribs includes an edge rib, a plurality of first ribs, and a plurality of second ribs. The edge rib extends along an edge of the holding plates. The plurality of first ribs is inclined to an extending direction of the first edge and to an extending direction of the second edge, and extends along straight lines connecting the first engaging portions and the second engaging portions. The plurality of the second ribs is connected to the first ribs and extends in the facing direction in which the first edge and the second edge face each other. Each of the plurality of first ribs has opposite ends connected to the edge rib. At least two of the plurality of first ribs extend in different directions from each other, and intersect with each other. At least one of the plurality of second ribs has opposite ends thereof connected to two first ribs intersecting with each other.

In the above-power storage device, at least one of the pair of holding plates has a plurality of ribs and a plurality of thin-walled portions, the thicknesses of which in the stacking direction are smaller than those of the plurality of ribs. The plurality of thin-walled portions is defined by the plurality of ribs. Thus, the weights of the holding plates are reduced by the plurality of thin-walled portions while the plurality of ribs secures the rigidities of the holding plates. Each of the plurality of first ribs is inclined to a facing direction in which the first edge and the second edge face each other, and extends along straight lines connecting the first engaging portions and the second engaging portions. At least two of the plurality of first ribs intersect with each other. Further, the plurality of the second ribs is connected to the first ribs and extends in the facing direction in which the first edge and the second edge face each other. Some of the plurality of second ribs has opposite ends connected to the first ribs that intersect with each other. Thus, the second ribs serve as diagonal beams for the first ribs that intersect with each other. According to this disposition of the ribs, the rigidities of the holding plates against a torsion due to a force applied to the holding plates from each of the connecting members through the first and the second engaging portions increases without expanding a region of the ribs. As a result, in this power storage device, the weights of the holding plates are reduced while a load applied to the power storage modules by the holding plates that holds the power storage modules is secured.

The plurality of first ribs may form a plurality of intersections described above. The plurality of intersections may be disposed between the first edge and the second edge in a direction that intersects the facing direction, as viewed in the stacking direction. According to this configuration, the weights of the holding plates are reduced while the rigidities of the centers of the holding plates are secured.

Each of the pair of holding plates may have a rectangular shape in which the first edge and the second edge parallel to each other are longer sides, as viewed in the stacking direction. Each of the engaging portions may be disposed in line with from one of the second engaging portions in the facing direction. In this case, since a load is evenly applied to the holding plates in the long side direction, the holding plates are hardly bent even when receiving a force from the connecting members. Thus, even if the areas of the ribs as viewed in the stacking direction are reduced, the rigidities of the holding plates against the load to be applied to the power storage modules are secured.

Each of the first engaging portions and second engaging portions may have a hole that extends through each of the holding plates in the stacking direction and with which one of the plurality of connecting members is engaged, and each of the plurality of thin-walled portions may have an area that is greater than that of the hole, as viewed in the stacking direction. In this case, segmentation of the thin-walled portions is suppressed, and easy molding of the holding plates is secured.

The plurality of second ribs may be formed in a defined region surrounded by and defined by the plurality of first ribs. In this case, the rigidities of the holding plates further increase.

The plurality of second ribs may be formed in each of the plurality of defined regions. The plurality of defined regions may include a first region and a second region. The second region may be positioned closer to the center of each of the holding plates than the first region is in the direction that intersects with the facing direction. An area density of the thin-walled portions in the first region may be higher than an area density of the thin-walled portions in the second region. In order to hold the plurality of power storage modules adequately, it is important to secure the rigidities of the centers of the holding plates. According to this configuration, the weights of the holding plates are reduced while the rigidities of the centers of the holding plates are secured.

In the defined regions, an area density of the thin-walled portions in a first portion may be higher than an area density of the thin-walled portions in a second portion that is positioned closer to the center of each of the holding plates than the first portion is in the direction that intersects with the facing direction in the defined region. According to this configuration, the weights of the holding plates are reduced while the rigidities of the centers of the holding plates are secured.

Each of the pair of holding plates may have a third edge and a fourth edge, and include a third engaging portion and a fourth engaging portion. The third edge and the fourth edge may intersect with and extend in a direction along each other. The third engaging portion may be disposed along the third edge, and some of the plurality of connecting members may be engaged with the third engaging portion. The fourth engaging portion may be disposed along the fourth edge, and some of the plurality of connecting members may be engaged with the fourth engaging portion. The plurality of ribs may include an edge rib and a corner rib. The edge rib may extend along edges of the holding plate. The corner rib is inclined to the first edge and the third edge. The corner rib may extend so as to connect the edge rib extending along the first edge and the edge rib extending along the third edge. In this case, the holding plate is hardly bent even when receiving a force from the connecting members. Thus, even if the areas of the ribs as viewed in the stacking direction are reduced, the rigidities of the holding plates against the load to be applied to the power storage modules are secured.

The plurality of ribs may include a support rib. The support rib may be inclined to the facing direction in which the first edge and the second edge face, and extend from the edge rib to the first ribs on a straight line connecting one of the first engaging portions and one of the second engaging portions. In a case where the number of the first ribs is large, the rigidities of the holding plates increase while the weights of the holding plates increase and the shapes of the thin-walled portions surrounded by the plurality of ribs become fine, as compared with a case where the number of the first ribs is small. When the shapes of the thin-walled portion are too fine, molding becomes difficult. The disposition of the above support ribs achieves balance among increasing the rigidities of the holding plates against the load applied to the power storage modules, suppressing an increase of the weights of the holding plates, and suppressing segmentation of the thin-walled portions.

Advantageous Effects of Invention

According to one aspect of the present invention, a power storage device in which weights of holding plates are reduced may be provided while a load applied to power storage modules by the holding plates that hold the power storage modules is secured.

to DESCRIPTION OF EMBODIMENTS

Figure 1:
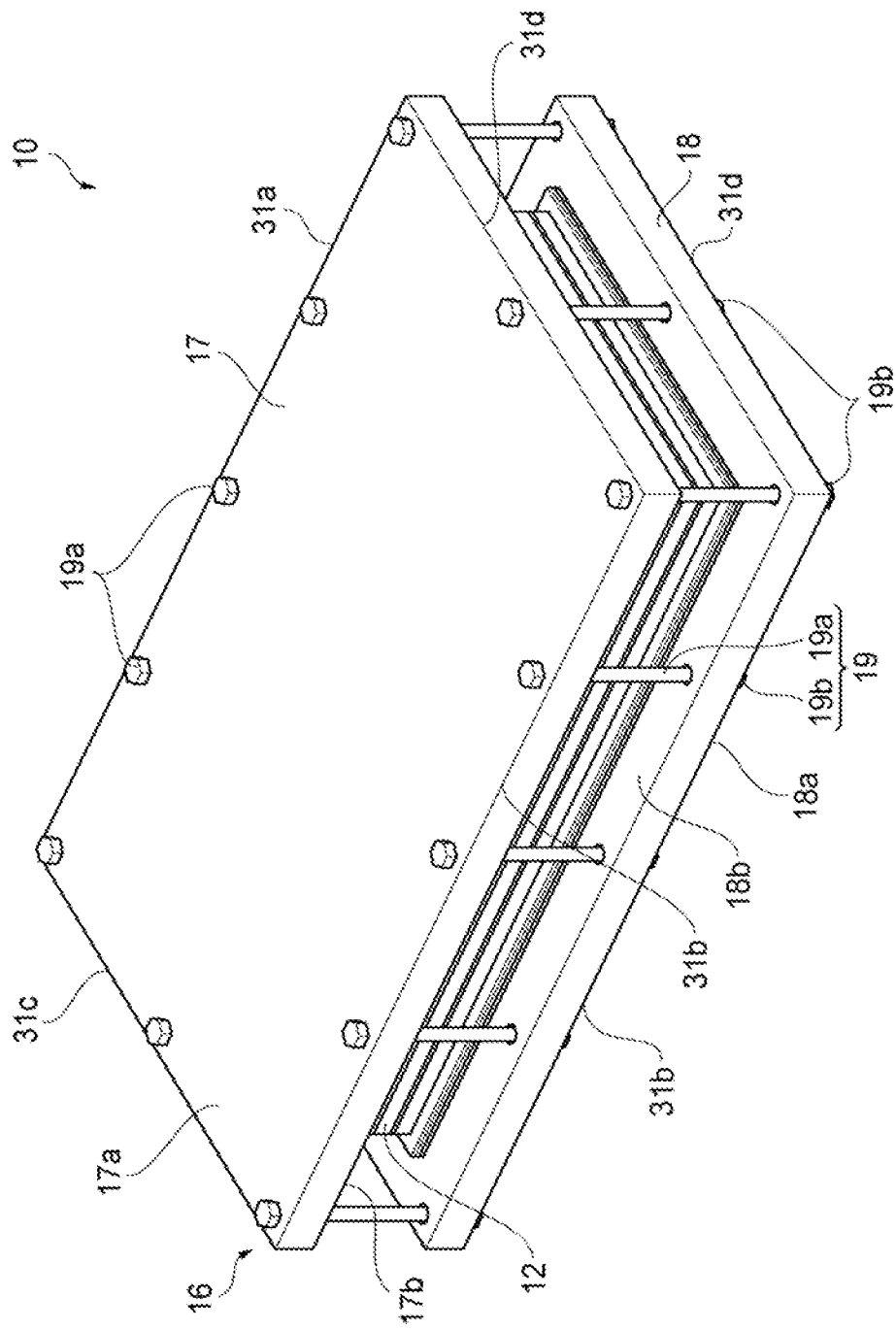
FIG. 1 is a schematic perspective view illustrating a power storage device according to a present embodiment.

Hereinafter, an embodiment of the present invention will be described in detail with reference to the accompanying drawings. In the description of the drawings, the same reference numerals are used for the same or equivalent parts, and the repeated descriptions are omitted.

Figure 2:
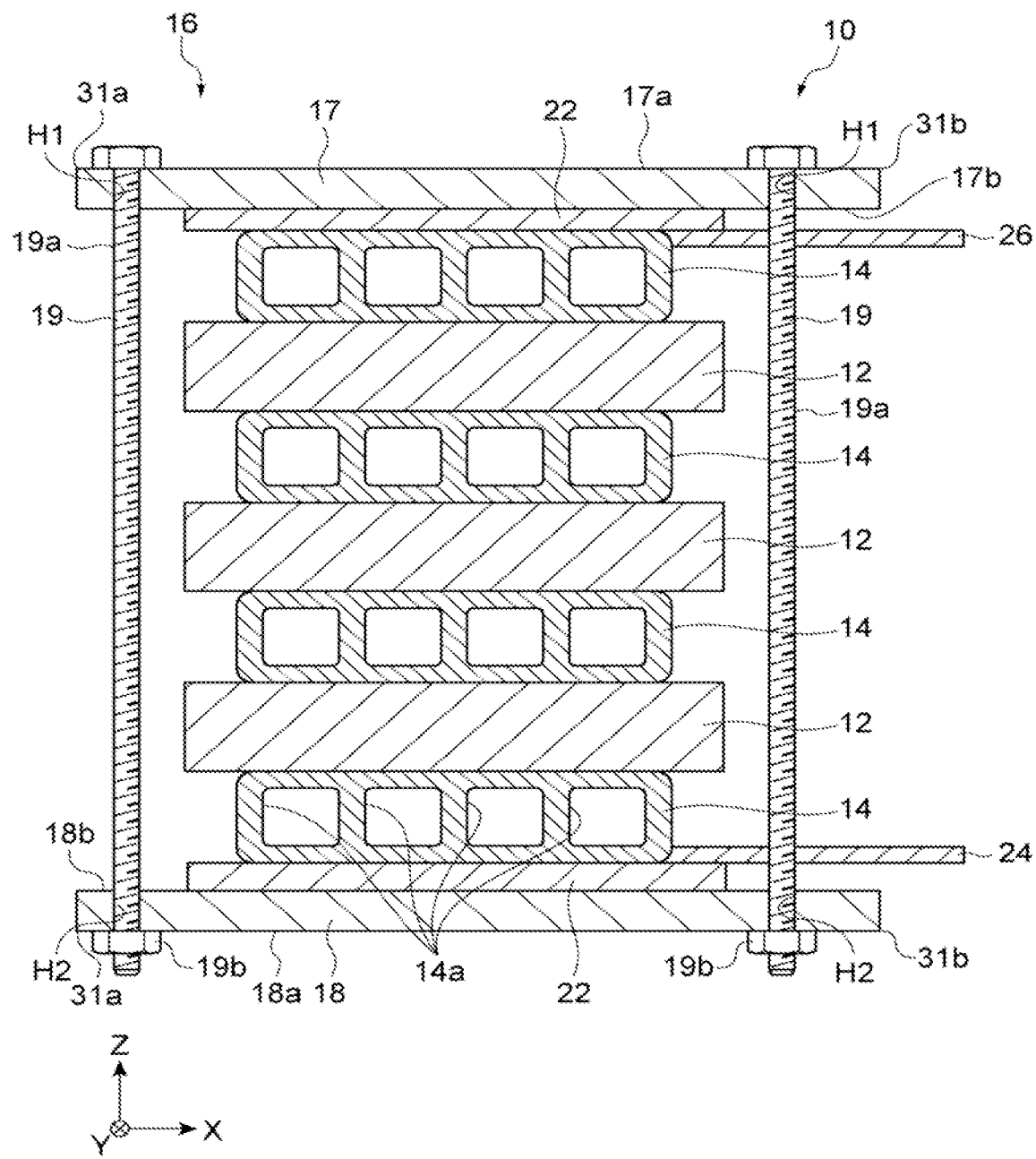
FIG. 2 is a schematic cross-sectional view of the power storage device of FIG. 1.

An embodiment of a power storage device will be described with reference to FIGS. 1 through 4, A power storage device 10 illustrated in FIGS. 1 and 2 is used as a battery for various vehicles such as a forklift truck, a hybrid vehicle, and an electric vehicle, for example. Although the power storage device 10 is provided with a plurality of power storage modules 12 (three power storage modules in the present embodiment), the power storage device 10 may be provided with a single power storage module 12. The power storage modules 12 each correspond to a bipolar battery. The power storage modules 12 each are, for example, a secondary battery such as a nickel-hydrogen secondary battery and a lithium ion secondary battery, or may be an electric double-layer capacitor. In the following description, the nickel-hydrogen secondary battery will be described as an example.

The plurality of power storage modules 12 may be stacked with conductive plates 14 such as a metal plate interposed therebetween. In the following, when it is simply stated as a "stacking direction", the "stacking direction" means a stacking direction of the plurality of power storage modules 12. The power storage modules 12 and the conductive plates 14 each have a rectangular shape, as viewed in the stacking direction.

In the present embodiment, a plurality of bipolar electrodes and a plurality of separators are stacked in each of the power storage modules 12. The separators are disposed between the bipolar electrodes disposed next to each other. Each of the bipolar electrodes includes an electrode plate, a positive electrode on one surface of the electrode plate, and a negative electrode on the other surface of the electrode plate. In other words, the positive electrode, the electrode plate, and the negative electrode are stacked in each of the bipolar electrodes, and the electrode plate of each of the bipolar electrodes is interposed between the positive electrode and the negative electrode. A stacking direction in which the plurality of bipolar electrodes and the separators are stacked, and a stacking direction in which the positive electrode, the electrode plate, and the negative electrode are stacked in each of the bipolar electrodes are the same as the stacking direction of the plurality of power storage modules 12.

The conductive plates 14 are also disposed on outer sides of the power storage modules 12 positioned on opposite ends in the stacking direction (the Z direction) of the power storage modules 12. The conductive plates 14 are electrically connected to the power storage modules 12 disposed next to the conductive plates 14. Thus, the plurality of power storage modules 12 are electrically connected in series in the stacking direction. In the stacking direction, a positive terminal 24 is connected to a conductive plate 14 positioned at one end, and a negative terminal 26 is connected to a connective plate 14 positioned at the other end. The positive terminal 24 may be formed integrally with the conductive plate 14 connected to the positive terminal 24. The negative terminal 26 may be formed integrally with the conductive plate 14 connected to the negative terminal 26. The positive terminal 24 and the negative terminal 26 extend in a direction that intersects with the stacking direction (the X direction). Charging and discharging of the power storage device 16 are performed through the positive terminal 24 and the negative terminal 26.

The conductive plates 14 can function as heat release plates for releasing heat generated in the power storage modules 12. Heat generated from the power storage modules 12 may be efficiently released to the outside with a refrigerant such as air and a gas passing through a plurality of spaces 14a formed inside the conductive plates 14, The spaces 14a extend, for example, in a direction that intersects with the stacking direction (the Y direction). Although the to conductive plates 14 are smaller than the power storage modules 12, as viewed in the stacking direction, they may be as large as the power storage modules 12, or larger than the power storage modules 12.

The power storage device 10 includes a holding member 16 configured to hold, in the stacking direction, the power storage modules 12 and the conductive plates 14 stacked alternately in the stacking direction. The holding member 16 includes a pair of holding plates 17, 18, and a plurality of connecting members 19 that connects the holding plates 17, 18 to each other, The pair of holding plates 17, 18 holds the plurality of power storage modules 12 therebetween in the stacking direction. An insulation film 22 such as a resin film is disposed between the holding plate 17 and the conductive plate 14 next to the holding plate 17, and between the holding plate 18 and the conductive plate 14 next to the holding plate 18. Each of the holding plates 17, 18 and the insulation films 22 has, for example, a rectangular shape, as viewed in the stacking direction. The insulation film 22 is larger than each of the conductive plates 14, and each of the holding plates 17, 18 is larger than each of the power storage modules 12.

The holding plate 17 has a main surface 17a and a main surface 17b positioned on the opposite side from the main surface 17a. The holding plate 18 has a main surface 18a and a main surface 18b positioned on the opposite side from the main surface 18a. The main surface 17b and the main surface 18b face each other. The holding plates 17, 18 each are made of a metal such as iron and aluminum.

The main surface 17b of the holding plate 17 is abutted against the conductive plate 14 connected to the negative terminal 26 with the insulation film 22 interposed therebetween, and the main surface 18b of the holding plate 18 is abutted against the conductive plate 14 connected to the positive terminal 24 with the insulation film 22 interposed therebetween. In this state, the connecting members 19 connect the pair of holding plates 17, 18 to each other. Accordingly, the insulation films 22, the conductive plates 14 and the power storage modules 12 are held to form a unit, and a holding load is applied in the stacking direction. In other words, the connecting members 19 apply a load to the plurality of power storage modules 12 in the stacking direction through the pair of holding plates 17, 18.

Each of the holding plates 17, 18 has a pair of edges 31a, 31b facing to each other, and a pair of edges 31c, 31d extending in a direction that intersects with the pair of edges 31a, 31b. In the present embodiment, each of the holding plates 17, 18 has a generally rectangular shape in a plan view, and the edges 31a, 31b extend in parallel with each other. Further, the edges 31c, 31d extend in parallel with each other. As viewed in the stacking direction, the edges 31a, 31b, 31c, 31d define the main surface 17a in the holding plate 17. As viewed in the stacking direction, the edges 31a, 31b, 31c, 31d define the main surface 18a in the holding plate 18. For example, the edges 31c, 31d are in parallel with each other and extend perpendicularly to the pair of edges 31a, 31b. The edge 31c is connected to one ends of the edge 31a and edge 31b, and the edge 31d is connected to the other ends of the edge 31a and the edge 31b. In the holding plates 17, 18 having a rectangular shape, the edges 31a, 31b are longer sides and the edges 31c, 31d are shorter sides. For example, the edge 31a corresponds to a first edge. For example, the edge 31b corresponds to a second edge. For example, the edge 31c corresponds to a third edge. For example, the edge 31d corresponds to a fourth edge.

Figure 3:
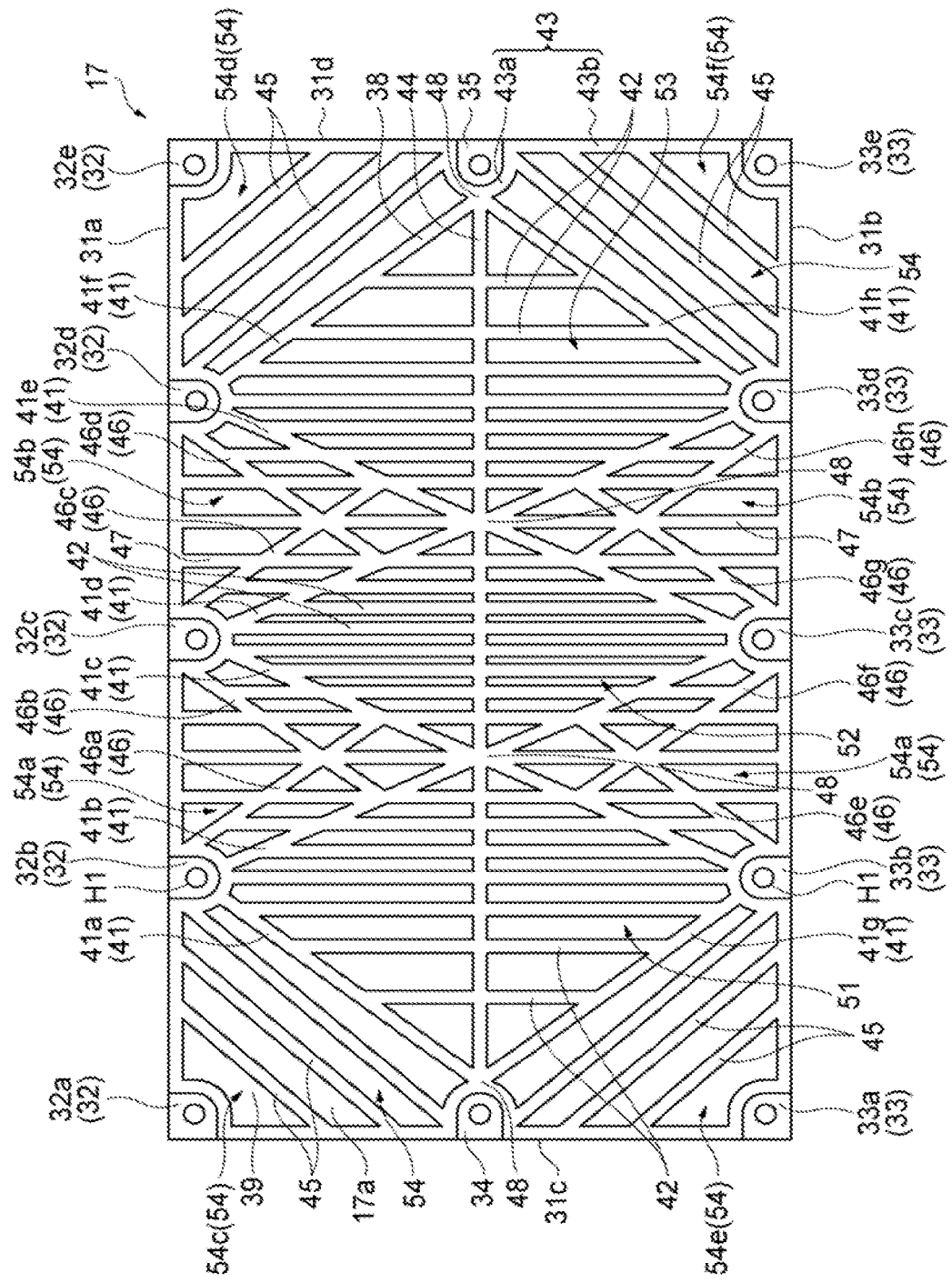
FIG. 3 is a plan view of a holding plate.
Figure 4:
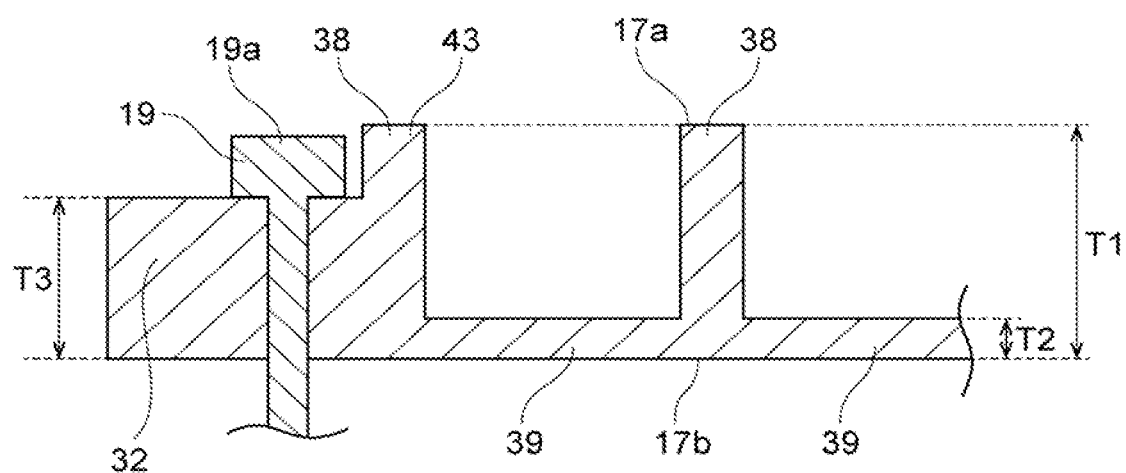
FIG. 4 is a partial cross-sectional view of the holding plate and a connecting member.

The following will further describe the configuration of the holding member 16 with reference to FIGS. 3 and 4. FIG. 3 is a plan view of the holding plate 17. FIG. 4 is a partial cross-sectional view of the holding plate 17. In the present embodiment, the holding plate 17 and the holding plate 18 have the same configuration. Each of the holding plates 17, 18 has the plurality of connecting members 19, and a plurality of engaging portions 32, 33, 34, 35 each of which its associated one of the connecting members 19 is engaged with. The engaging portions 32, 33, 34, 35 are disposed along the edges 31a, 31b, 31c, 31d, respectively. In the holding plate 17, the engaging portions 32, 33, 34, 35 are formed in the main surface 17a. In the holding plate 18, the engaging portions 32, 33, 34, 35 are formed in the main surface 18a. For example, the engaging portions 32 correspond to first engaging portions. For example, the engaging portions 33 correspond to second engaging portions. For example, the engaging portion 34 corresponds to a third engaging portion. For example, the engaging portion 35 corresponds to a fourth engaging portion.

A plurality of the engaging portions 32 of the holding plate 17 and a plurality of the engaging portions 32 of the holding plate 18 are disposed at positions overlapping with each other as viewed in the stacking direction. A plurality of the engaging portions 33 of the holding plate 17 and a plurality of the engaging portions 33 of the holding plate 18 are disposed at positions overlapping with each other as viewed in the stacking direction. The engaging portion 34 of the holding plate 17 and the engaging portion 34 of the holding plate 18 are disposed at positions overlapping with each other as viewed in the stacking direction. The engaging portion 35 of the holding plate 17 and the engaging portion 35 of the holding plate 18 are disposed at positions overlapping with each other as viewed in the stacking direction.

In each of the holding plates 17, 18, the plurality of engaging portions 32 and the plurality of engaging portions 33 are line-symmetric with respect to an imaginary line extending through a midpoint in a facing direction in which the edge 31a and the edge 31b face each other. In other words, each of the plurality of engaging portions 32 is disposed in line with one of the plurality of engaging portions 33 in the facing direction in which the edge 31a and the edge 31b face each other. That is, each of the plurality of engaging portions 32 formed along the edge 31a is aligned with one of the plurality of engaging portions 33 formed along the edge 31b in the facing direction perpendicular to the edge 31a and the edge 31b.

In the present embodiment, the plurality of engaging portions 32 includes five engaging portions 32a, 32b, 32c, 32d, 32e which are disposed at regular intervals along the edge 31a. The engaging portion 32a is disposed on the one end of the edge 31a, and the engaging portion 32e is disposed on the other end of the edge 31a. In other word, of the plurality of engaging portions 32, the engaging portions 32a, 32e are those that are disposed the closest to ends of the edge 31a, The engaging portions 32b, 32c, 32d are disposed in this order between the engaging portions 32a, 32e along the edge 31a.

In the present embodiment, the plurality of engaging portions 33 includes five engaging portions 33a, 33b, 33c, 33d, 33e which are disposed at regular intervals along the edge 31b. The engaging portion 33a is disposed on the one end of the edge 31b, and the engaging portion 33e is disposed on the other end of the edge 31b. In other word, of the plurality of engaging portions 33, the engaging portions 33a, 33e are those that are disposed the closest to ends of the edge 31b. The engaging portions 33b, 33c, 33d are disposed in this order between the engaging portions 33a, 33e along the edge 31b.

The engaging portion 34 is disposed between the engaging portion 32a and the engaging portion 33a. The engaging portions 32a, 34, 33a are disposed in this order along the edge 31c. The engaging portion 35 is disposed between the engaging portion 32e and the engaging portion 33e. The engaging portions 32e, 35, 33e are disposed in this order along the edge 31d.

A through hole H1 extending through the holding plate 17 in the stacking direction is formed in each of the engaging portions 32, 33, 34, 35 of the holding plate 17. A through hole H2 extending through the holding plate 18 in the stacking direction is formed in each of the engaging portions 32, 33, 34, 35 of the holding plate 18 (see FIG. 2). The through holes H1, H2 are disposed outward of the power storage modules 12, as viewed in the stacking direction. Each of the plurality of connecting members 19 is engaged with its associated one of the through holes H1, H2.

Each of the plurality of connecting members 19 has a bolt 19a including a shaft portion extending in the stacking direction, and a nut 19b into which the bolt 19a is screwed. The shaft portion of the bolt 19a is inserted through each of the through holes H1, H2. A head portion of the bolt 19a is disposed on the main surface 17a of the holding plate 17, and a screw tip of the bolt 19a projects out from the main surface 18a of the holding plate 18. The nut 19b is screwed onto the screw tip of the bolt 19a. The nut 19b is disposed on the main surface 18a of the holding plate 18. The bolts 19a and nuts 19b of the plurality of connecting members 19 apply a load to the plurality of power storage modules 12 through the pair of holding plates 17, 18 in the stacking direction.

Each of the holding plates 17, 18 has a plurality of ribs 38 and a plurality of thin-walled portions 39. Each of the plurality of thin-walled portions 39 is defined by the plurality of ribs 38. As illustrated in FIG. 4, the thickness of each of the thin-walled portions 39 in the stacking direction is smaller than those of the plurality of ribs 38 and those of the plurality of engaging portions 32, 33, 34, 35. In the present embodiment, a minimum thickness T1 of each of the ribs 38 is 15 mm or greater and 25 mm or less. A minimum thickness T2 of each of the thin-walled portion 39 is 2 mm or greater and 7 mm or less. A minimum thickness T3 of each of the engaging portions 32, 33, 34, 35 is greater than 7 mm and 20 mm or less. Each of the thin-walled portions 39 has an area greater than that of each of the through holes H1, H2, as viewed in the stacking direction. The area of each of the thin-walled portions 39 only need be at least 19 mm$^2$, as viewed in the stacking direction. In the present embodiment, the area of each of the thin-walled portions 39 is 19.6 mm$^2$ or greater as viewed in the stacking direction.

The plurality of ribs 38 and the plurality of thin-walled portions 39 are formed in the main surface 17a of the holding plate 17 and the main surface 18a of the holding plate 18. The main surface 17b of the holding plate 17 and the main surface 18b of the holding plate 18 are flat. In the present embodiment, the widths of the ribs 38 are the same, as viewed in the stacking direction. The width of each of the ribs 38 corresponds to a length of each of the ribs 38 in a direction perpendicular to the extending direction of each of the ribs 38 and the stacking direction.

The plurality ribs 38 includes a plurality of first ribs 41, a plurality of second ribs 42, an edge rib 43, a center rib 44, a plurality of corner ribs 45, a plurality of support ribs 46, and a plurality of adjustment ribs 47. Each of the first ribs 41 is inclined to the extending direction of the edge 31a and the extending direction of the edge 31b, and extends along one of straight lines connecting the engaging portions 32 and the engaging portions 33. Opposite ends of each of the first ribs 41 are connected to the edge rib 43, respectively. At least two of the plurality of first ribs 41 extend in direction different from each other, and form an intersection 48 where the two of the plurality of first ribs 41 intersect with each other.

In the present embodiment, the plurality of first ribs 41 forms a plurality of intersections 48. The plurality of intersections 48 is disposed in a direction that intersects with the facing direction in which the edge 31a and the edge 31b face, between the edge 31a and the edge 31b, as viewed in the stacking direction. In the present embodiment, since the engaging portions 32 and the engaging portions 33 are arranged in the facing direction so as to correspond to each other, the first ribs 41, which extend inclined to the edge 31a and the edge 31b, intersect at the centers of the holding plates 17, 18.

In the present embodiment, opposite ends of each of the first ribs 41 are connected to two engaging portions of the plurality of the engaging portions 32, 33, 34, 35. The plurality of first ribs 41 defines a plurality of defined regions 51, 52, 53. The defined regions 51, 52, 53 have a substantially rhombus shape, as viewed in the stacking direction. The defined regions 51, 53 each correspond to, for example, a first region. The defined region 52 corresponds to, for example, a second region.

In the present embodiment, the plurality of first ribs 41 includes eight first rib parts 41a, 41b, 41c, 41d, 41e, 41f, 41g, 41h. Opposite ends of the first rib part 41a are connected to the engaging portion 32b and the engaging portions 34. Opposite ends of the first rib part 41b are connected to the engaging portion 32b and the engaging portions 33c. Opposite ends of the first rib part 41c are connected to the engaging portion 32c and the engaging portions 33b. Opposite ends of the first rib part 41d are connected to the engaging portion 32c and the engaging portions 33d. Opposite ends of the first rib part 41e are connected to the engaging portion 32d and the engaging portions 33c. Opposite ends of the first rib part 41f are connected to the engaging portion 32d and the engaging portion 35. Opposite ends of the first rib part 41g are connected to the engaging portion 33b and the engaging portion 34. Opposite ends of the first rib part 41h are connected to the engaging portion 33d and the engaging portion 35.

In the present embodiment, the defined region 51 is surrounded by and defined by the first rib parts 41a, 41b, 41c, 41g. The defined region 52 is surrounded by and defined by the first rib parts 41b, 41c, 41d, 41e. The defined region 53 is surrounded by and defined by the first rib parts 41d, 41e, 41f, 41h. In this specification, a region that is "surrounded by and defined by" means a region where 70 percent or greater of an edge of the region is formed by the plurality of ribs.

As viewed in the stacking direction, the defined region 52 is positioned closer to the center of one of the holding plates 17, 18 than the defined regions 51, 53 are in a direction that intersects with the facing direction in which the edge 31a and the edge 31b face each other The "center" means a position which is equidistant from the opposite ends of the edge 31c as viewed in a direction perpendicular to the facing direction in which the edge 31a and the edge 31b face each other, and is also equidistant from the opposite ends of the edge 31a as viewed in the direction perpendicular to the facing direction in which the edge 31c and the edge 31d face each other.

The plurality of second ribs 42 is formed in each of the defined regions 51, 52, 53 surrounded by and defined by the plurality of first ribs 41. In other words, the plurality of second ribs 42 extends in each of the defined regions 51, 52, 53. Some of the plurality of second ribs 42 has opposite ends thereof connected to the first ribs 41 that intersect with each other. Each of the second ribs 42 extends in a direction different from any of the plurality of first ribs 41. Each of the second ribs 42 is connected to the first ribs 41 and extends in the facing direction in which the edge 31a and the edge 31b face each other. In the present embodiment, the plurality of second ribs 42 extends in a direction perpendicular to the edges 31a, 31b.

An area density of the thin-walled portions 39 in each of the defined regions 51, 53 is higher than an area density of the thin-walled portions 39 in the defined region 52. In other words, an area density of the ribs 38 formed in each of the defined regions 51, 53 is lower than an area density of the ribs 38 formed in the defined region 52, as viewed in the stacking direction. In the present embodiment, an area density of the second ribs 42 in each of the defined regions 51, 53 is lower than an area density of the second ribs 42 in the defined region 52. The "area density" means a value obtained by dividing a total area of objects in the defined region by an area of the defined region, as viewed in the stacking direction. For example, the "area density of the thin-walled portions" is a value obtained by dividing the total area of the plurality of thin-walled portions in each of the defined regions by the area of the concerned defined region.

Each of the defined regions 51, 52, 53 is formed so that the area density of the thin-walled portions 39 in each of the defined regions 51, 52, 53 becomes lower as closer to the center of the holding plates 17, 18 in the direction that intersects with the facing direction in which the edge 31a and the edge 31b face each other. In other words, the area density of the thin-walled portions 39 in a first portion in each of the defined regions 51, 52, 53 is higher than the area density of the thin-walled portions 39 in a second portion of each of the defined regions 51, 52, 53 that is positioned closer to the center of one of the holding plates 17, 18 in the direction that intersects with the facing direction in which the edge 31a and the edge 31b face each other. In the present embodiment, in the defined regions 51, 52, 53, distances between the adjacently disposed second ribs 42 in the defined regions 51, 52, 53 becomes smaller as closer to the center of one of the holding plates 17, 18 in a direction along the edge 31a.

The edge rib 43 extends along the edges 31a, 31b, 31c, 31d of the holding plates 17, 18. As viewed in the stacking direction, the edge rib 43 surrounds the ribs 38 out of the plurality of ribs 38 other than the edge rib 43. The edge rib 43 includes an edge rib part 43a and an edge rib part 43b.

In the present embodiment, the edge rib part 43a is included in the engaging portions 32, 33, 34, 35, and forms the edges of the engaging portions 32, 33, 34, 35. The through holes H1, H2 are surrounded by the edge rib part 43a. The edge rib part 43b is straight, as viewed in the stacking direction. The edge rib part 43b extends along the edges 31a, 31b, 31c, 31d and connects between the engaging portions 32, 33, 34, 35 disposed next to each other. Of the plurality of ribs 38, only the edge rib 43 is connected to the engaging portions 32a, 32e, 33a, 33e. The first ribs 41 are not connected to the engaging portions 32a, 32e, 33a, 33e.

The center rib 44 extends in a direction along the edge 31a. Opposite ends of the center rib 44 are connected to the engaging portion 34 and the engaging portion 35.

In the holding plates 17, 18, a plurality of defined regions 54 is surrounded by and defined by the edge rib 43 and the first ribs 41. The plurality of defined regions 54 is positioned outward of the defined regions 51, 52, 53. The defined regions 54 each correspond to, for example, a third region. The plurality of defined regions 54 includes two defined regions 54a defined by the edge rib 43 and the first rib parts 41b, 41c, and two defined regions 54b defined by the edge rib 43 and the first rib parts 41d, 41e.

The plurality of defined regions 54 further includes a defined region 54c, a defined region 54d, a defined region 54e, and a defined region 54f. The defined region 54c is surrounded by and defined by the edge rib 43 and the first rib part 41a. The defined region 54d is surrounded by and defined by the edge rib 43 and the first rib part 41f. The defined region 54e is surrounded by and defined by the edge rib 43 and the first rib part 41g. The defined region 54f is surrounded by and defined by the edge rib 43 and the first rib part 41h. The defined regions 54c, 54d are positioned closer to the ends of the edge 31a than the defined regions 51, 52, 53 are. The defined regions 54e, 54f are positioned closer to the ends of the edge 31b than the defined regions 51, 52, 53 are.

The plurality of corner ribs 45 is formed in the defined regions 54c, 54d, 54e, 54f, as viewed in the stacking direction. Each of the defined regions 54c, 54d, 54e, 54f is provided with the plurality of corner ribs 45. The plurality of corner ribs 45 is inclined to the edges 31a, 31b, 31c, 31d.

Opposite ends of the plurality of corner ribs 45 formed in the defined region 54c are connected to a portion of the edge rib part 43b formed along the edge 31a and a portion of the edge rib part 43b formed along the edge 31c, Opposite ends of the plurality of corner ribs 45 formed in the defined region 54d are connected to a portion of the edge rib part 43b formed along the edge 31a and a portion of the edge rib part 43b formed along the edge 31d. Opposite ends of the plurality of corner ribs 45 formed in the defined region 54e are connected to a portion of the edge rib part 43b formed along the edge 31b and a portion of the edge rib part 43b formed along the edge 31c. Opposite ends of the plurality of corner ribs 45 formed in the defined region 54f are connected to a portion of the edge rib part 43b formed along the edge 31b and a portion of the edge rib part 43b formed along the edge 31d.

As viewed in the stacking direction, the area densities of the thin-walled portions 39 in the defined regions 54c, 54d, 54e, 54f are higher than the area densities of the thin-walled portions in the defined regions 51, 52, 53. In other words, the area densities of the plurality of ribs 38 formed in the defined regions 54c, 54d, 54e, 54f are lower than the area densities of the plurality of ribs 38 formed in the defined regions 51, 52, 53, as viewed in the stacking direction. In the present embodiment, the area densities of the corner ribs 45 in the defined regions 54c, 54d, 54e, 54f are lower than the area densities of the second ribs 42 in the defined regions 51, 52, 53.

The plurality of support ribs 46 is formed in the defined regions 54a, 54b. Each of the support ribs 46 is inclined to the extending direction of the edge 31a and the extending direction of the edge 31b, and extends along a straight line connecting one of the engaging portions 32 and one of the engaging portions 33.

Each of the support ribs 46 extends from the edge rib 43 to one of the first ribs 41. Opposite ends of each of the support ribs 46 are connected to one of the plurality of engaging portions 32, 33 and one of the plurality of first ribs 41. Each of the plurality of support ribs 46 extends in a direction different from one of the first ribs 41 extending from the engaging portion 32 or 33 to which the one of the support ribs 46 is connected. The plurality of support ribs 46 includes support rib parts 46a, 46b, 46c, 46d, 46e, 46f, 46g, 46h.

The support rib part 46a extends towards the edge 31b from the engaging portion 32b to the first rib part 41c. The support rib part 46b extends towards the edge 31b from the engaging portion 32c to the first rib part 41b. The support rib part 46c extends towards the edge 31b from the engaging portion 32c to the first rib part 41e. The support rib part 46d extends towards the edge 31b from the engaging portion 32d to the first rib part 41d The support rib part 46e extends towards the edge 31a from the engaging portion 33b to the first rib part 41b. The support rib part 46f extends towards the edge 31a from the engaging portion 33c to the first rib part 41c. The support rib part 46g extends towards the edge 31a from the engaging portion 33c to the first rib part 41d. The support rib part 46h extends towards the edge 31a from the engaging portion 33d to the first rib part 41e.

The support rib part 46a extends towards the engaging portion 33d. The support rib part 46b extends towards the engaging portion 33a. The support rib part 46c extends towards the engaging portion 33e. The support rib part 46d extends towards the engaging portion 33b. The support rib part 46e extends towards the engaging portion 32d. The support rib part 46f extends towards the engaging portion 32a. The support rib part 46g extends towards the engaging portion 32e. The support rib part 46h extends towards the engaging portion 32b.

The plurality of adjustment ribs 47 is formed in the plurality of defined regions 54a, 54b. Each of the plurality of adjustment ribs 47 extends in a direction perpendicular to the edges 31a, 31b. Opposite ends of the adjustment ribs 47 are connected either to the edges 31a, 31b and the support ribs 46 or to the support ribs 46 and the first ribs 41. As viewed in the stacking direction, the area density of the thin-walled portions 39 in each of the defined regions 54a, 54b is higher than the area density of the thin-walled portions 39 in the defined region 52. In other words, the area density of the plurality of ribs 38 in each of the defined regions 54a, 54b is lower than the area density of the ribs 38 in the defined region 52, as viewed in the stacking direction.

Figure 5:
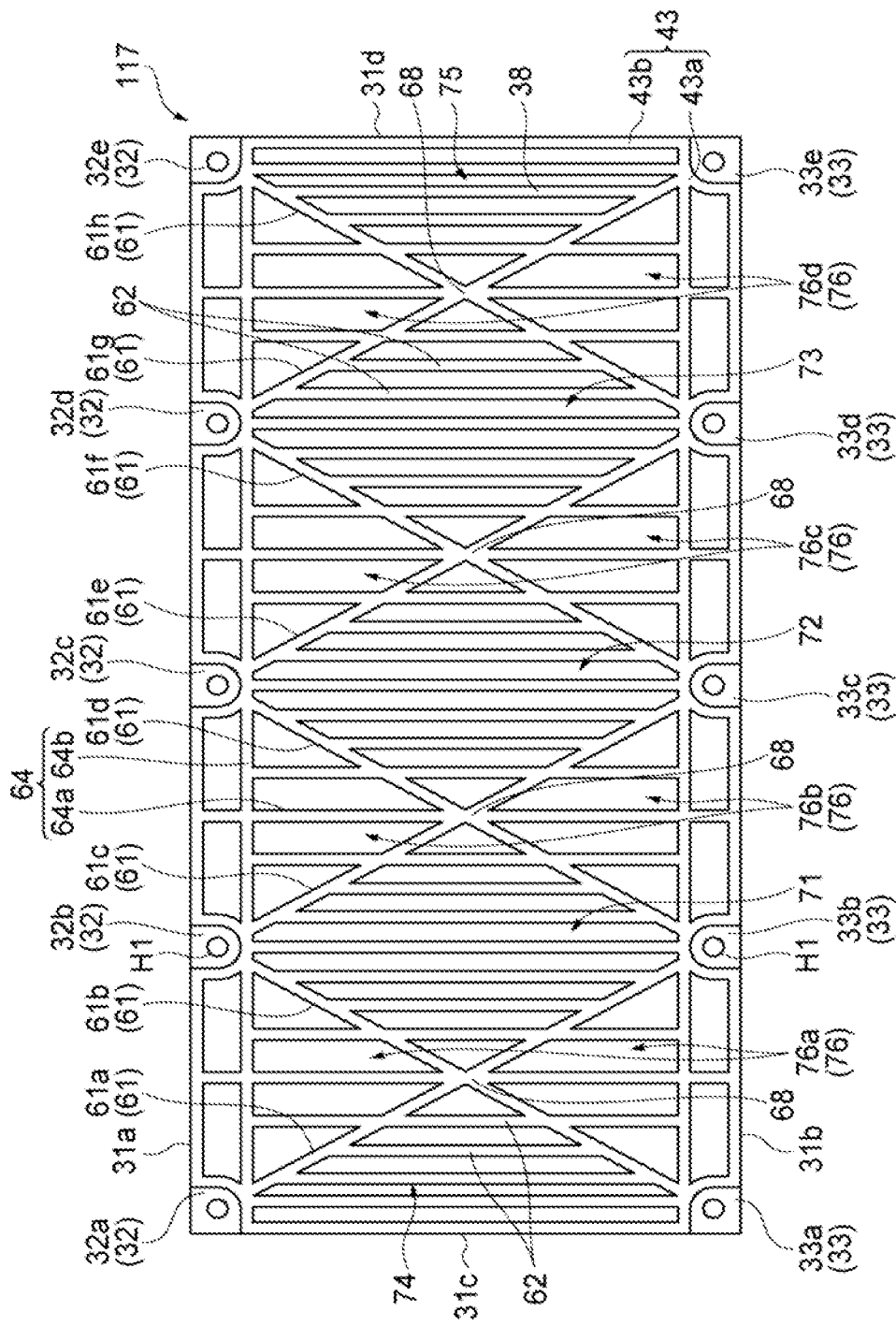
FIG. 5 is a plan view of a holding plate of the power storage device according to a modification example of the present embodiment.

Next, a structure of a holding plate 117 according to a modification example of the present embodiment will be described with reference to FIG. 5. The holding plate 117 of the present modification example is generally similar to or the same as the holding plates 17, 18 of the above-described embodiment. The holding plate 117 of the present modification example differs from the holding plates 17, 18 of the above-described embodiment in that the engaging portions 34, 35 are not formed and the plurality of ribs 38 is thus changed. In the following, differences between the holding plates 17, 18 of the above-described embodiment and the holding plate 117 of the present modification example will be mainly described.

In the present modification example, the engaging portions 34, 35 are not formed in the holding plate 117. The plurality of ribs 38 includes a plurality of first ribs 61, a plurality of second ribs 62, an edge rib 43, and an adjustment rib 64. Each of the first ribs 61 is inclined to the extending direction of the edge 31a and the extending direction of the edge 31b, and extends along straight lines connecting the engaging portions 32 and the engaging portions 33. Opposite ends of each of the first ribs 61 are connected to the edge rib 43, respectively. At least two of the plurality of first ribs 61 extend in different directions from each other and form an intersection 68.

Also in the modification example, the plurality of first ribs 61 forms a plurality of intersections 68. The intersections 68 are arranged in a direction that intersects with the facing direction in which the edge 31a and the edge 31b face each other, between the edge 31a and the edge 31b, as viewed in the stacking direction. Also in the present modification example, opposite ends of each of the first ribs 61 are connected to two engaging portion of the plurality of the engaging portions 32, 33. Also in the present modification example, since the plurality of engaging portions 32 and the plurality of engaging portions 33 are arranged in the facing direction so as to correspond to each other, the first ribs 61, which extend inclined to the edge 31a and the edge 31b, intersect at the center of the holding plate 117.

In the present modification example, the plurality of first ribs 61 includes eight first rib parts 61a, 61b, 61c, 61d, 61e, 61f, 61g, 61h. Opposite ends of the first rib part 61a are connected to the engaging portion 32a and the engaging portions 33b. Opposite ends of the first rib part 61b are connected to the engaging portion 32b and the engaging portions 33a. Opposite ends of the first rib part 61c are connected to the engaging portion 32b and the engaging portions 33c. Opposite ends of the first rib part 61d are connected to the engaging portion 32c and the engaging portions 33b. Opposite ends of the first rib part 61e are connected to the engaging portion 32c and the engaging portions 33d. Opposite ends of the first rib part 61f are connected to the engaging portion 32d and the engaging portions 33c. Opposite ends of the first rib part 61g are connected to the engaging portion 32d and the engaging portions 33e. Opposite ends of the first rib part 61h are connected to the engaging portion 32e and the engaging portions 33d.

In the present modification example, a defined region 71 is surrounded by and defined by the first rib parts 61a, 61b, 61c, 61d. A defined region 72 is t5 surrounded by and defined by the first rib parts 61c, 61d, 61e, 61f. A defined region 73 is surrounded by and defined by the first rib parts 61e, 61f, 61g, 61h. A defined regions 74 is surrounded by and defined by the first rib part 61a, the first rib part 61b, and the edge rib 43 extending along the edge 31c. A defined regions 75 is surrounded by and defined by the first rib part 61g, the first rib part 61h, and the edge rib 43 extending along the edge 31d. As viewed in the stacking direction, the defined region 72 is positioned closer to the center of the holding plate 117 than the defined regions 71, 73 are in a direction that intersects with the facing direction in which the edge 31a and the edge 31b face each other. The defined regions 71, 72, 73 each have a substantially rhombus shape, as viewed in the stacking direction. The defined regions 71, 73 correspond to, for example, the first region, respectively. The defined region 72 corresponds to, for example, the second region.

The plurality of second ribs 62 is formed in each of the plurality of defined regions 71, 72, 73, 74, 75 surrounded by and defined by the plurality of first ribs 61, In other words, the plurality of second ribs 62 extends in each of the defined regions 71, 72, 73, 74, 75. Opposite ends of some of the plurality of second ribs 62 are connected to the first ribs 61 intersecting with each other. Each of the second ribs 62 extend in a direction different from any of the plurality of first ribs 61. Each of the second ribs 62 is connected to the first ribs 61, and extends in the facing direction in which the edge 31a and the edge 31b face each other. In the present modification example, each of the second ribs 62 extends in a direction perpendicular to the edges 31a, 31b.

The area densities of the thin-walled portions 39 in the defined regions 71 72, 73 are the same. Similarly to the above-described embodiment, the area density of the thin-walled portions 39 in each of the defined regions 71, 73 may be greater than the area density of the thin-walled portion 39 in the defined region 72. In the present modification example, distances between the second ribs 62 disposed adjacently to each other are constant in the direction along the edge 31a in each of the defined regions 71, 72, 73, 74, 75.

In the holding plate 117, a plurality of defined regions 76 is surrounded by and defined by the edge rib 43 along the edges 31a, 31b and the first ribs 61. The plurality of defined regions 76 is positioned outward of the defined regions 71, 72, 73, 74, 75. The area density of the thin-walled portions 39 in the defined regions 76 is higher than the area density of each of the thin-walled portion 39 in the defined regions 71, 72, 73, 74, 75.

The plurality of defined regions 76 includes two defined regions 76a, two defined regions 76b, two defined regions 76c, and two defined regions 76d. The two defined regions 76a are surrounded by and defined by the edge rib 43 along the edges 31a, 31b, and the first rib parts 61a, 61b. The two defined regions 76b are surrounded by and defined by the edge rib 43 and the first rib parts 61c, 61d. The two defined regions 76c are surrounded by and defined by the edge rib 43 and the first rib parts 61e, 61f. The two defined regions 76d are surrounded by and defined by the edge rib 43 and the first rib parts 61g, 61h.

Figure 6:
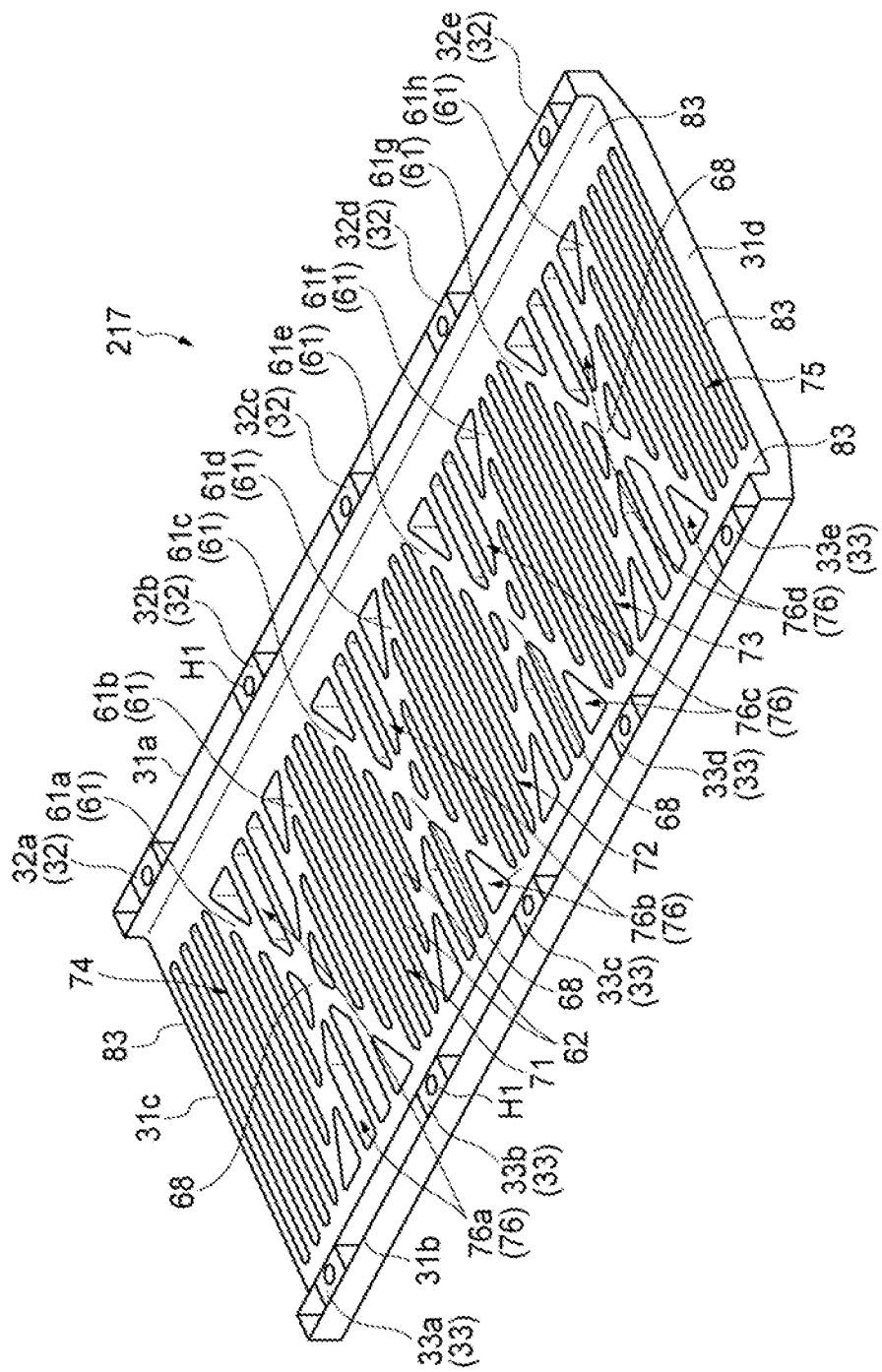
FIG. 6 is a perspective view of the holding plate of the power storage device according to a modification example of the present embodiment.

The plurality of adjustment ribs 64 is formed in the plurality of defined regions 76a, 76b, 76c, 76d. The plurality of adjustment ribs 64 includes an adjustment rib part 64a extending in a direction perpendicular to the edge 31a, and an adjustment rib part 64b extending in a direction along the edge 31a. The area density of the thin-walled portions 39 in the defined regions 76 is higher than the area density of the thin-walled portion 39 in each of the defined regions 71, 72, 73, 74, 75. In other words, the area density of the plurality of ribs 38 in the defined regions 76 is lower than the area density of the ribs 38 in each of the defined regions 71, 72, 73, 74, 75, Next, a structure of a holding plate 217 according to a modification example of the present embodiment will be described with reference to FIG. 6. The holding plate 217 of the present modification example is generally similar to or the same as the holding plate 117 of the above-described modification example. The holding plate 217 of the present modification example differs from the holding plate 117 of the above-described modification example in that the holding plate 217 has a U-shape in cross section and the plurality of ribs 38 is thus changed. In the following, differences between the holding plate 117 of the above-described modification example and the holding plate 217 of the present modification example will be mainly described.

In the holding plate 217, a plurality of engaging portions 32, 33 projects towards the other holding plate which forms a pair with the holding plate 217, in the stacking direction. In the holding plate 217, the plurality of ribs 38 includes a plurality of first ribs 61, a plurality of second ribs 62, an edge rib 83, and an adjustment rib. in the present modification example, opposite ends of each of the plurality of first ribs 61 are connected to the edge rib 83, respectively. Opposite ends of the first ribs 61 are not directly connected to the engaging portions 32, 33.

The edge rib 83 extends along the edges 31a, 31b, 31c, 31d in the holding plate 217. As viewed in the stacking direction, the edge rib 83 surrounds the plurality of ribs 38 other than the edge rib 83. As viewed in the stacking direction, a width of the edge rib 83 formed along the edge 31a and the edge 31b is greater than a width of the edge rib 83 formed along the edge 31c and the edge 31d. As viewed in the stacking direction, the width of the edge rib 83 formed along the edge 31a and the edge 31b is greater than width of each of the ribs 38 other than the edge rib 83. The width of the edge rib 83 means a length of each of the edge ribs 83 in a direction perpendicular to the extending direction of each of the edge ribs 83 and the stacking direction. In the holding plate 217, the edge rib 83 is disposed between the plurality of engaging portions 32, 33, as viewed in the stacking direction.

In the holding plate 217, a defined region 74 is surrounded by and defined by a first rib part 61a, a first rib part 61b, and the edge rib 83 along the edge 31*c*. A defined region 75 is surrounded by and defined by a first rib part 61*g*, a first rib part 61*h*, and the edge rib 83 along the edge 31*d*.

In the holding plate 217, a plurality of defined regions 76 is surrounded by and defined by the edge rib 83 along the edges 31*a*, 31*b* and the first ribs 61. The plurality of defined regions 76 is positioned outward of the defined regions 71, 72, 73, 74, 75. The plurality of defined regions 76 includes two defined regions 76*a*, two defined regions 76*b*, two defined regions 76*c*, and two defined regions 76*d*. The two defined regions 76*a* are surrounded by and defined by the edge rib 83 along the edges 31*a*, 31*b*, and the first rib parts 61*a*, 61*b*. More specifically, the two defined regions 76*a* are defined as a substantially triangular region surrounded by a portion of the edge rib 83 that extends along the edge 31*a* from the engaging portion 32*a* to the engaging potion 32*b*, and the first rib parts 61*a*, 61*b* that intersect with each other, and a substantially triangular region surrounded by a portion of the edge rib 83 that extends along the edge 31*b* from the engaging portion 33*a* to the engaging portion 33*b*, and the first rib parts 61*a*, 61*b* that intersect with each other. Similarly, the two defined regions 76*b* are defined as two substantially triangular regions surrounded by portions of the edge rib 83 that extends along the edges 31*a*, 31*b* and the first rib parts 61*c*, 61*d* that intersect with each other. The two defined regions 76*c* are defined as two substantially triangular regions surrounded by portions of the edge rib 83 that extends along the edges 31*a*, 31*b* and the first rib parts 61*e*, 61*f* that intersect with each other. The two defined regions 76*d* are defined as two substantially triangular regions surrounded by portions of the edge rib 83 that extends along the edges 31*a*, 31*b* and the first rib parts 61*g*, 61*h* that intersect with each other.

As has been described, in the power storage device 10, the holding plates 17, 18, 117, 217 have the plurality of ribs 38 and the plurality of thin-walled portions 39 having the thicknesses smaller than the plurality of ribs 38 has in the stacking direction. The plurality of thin-walled portions 39 is defined by the plurality of ribs 38. Thus, the plurality of ribs 38 secures the rigidities of the holding plates 17, 18, 117, 217 while the plurality of thin-walled portions 39 reduces the weights of the holding plates 17, 18, 117, 217.

Each of the first ribs 41, 61 is inclined to the extending direction of the edge 31*a* and the extending direction of the edge 31*b*, and extends along straight lines connecting the engaging portions 32 and the engaging portions 33. At least two of the plurality of first ribs 41, 61 intersect with each other. Further, each of the plurality of second ribs 42, 62 extends in the facing direction in which the edge 31*a* and the edge 31*b* face each other. Some of the plurality of second ribs 42, 62 has opposite ends thereof connected to the first ribs 41, 61 intersecting with each other. Thus, the second ribs 42. 62 serve as diagonal beams for the first ribs 41, 61 intersecting with each other. Such a configuration of the ribs 38 increases the rigidities of the holding plates 17, 18, 117, 217 against a torsion due to a force applied to the holding plates 17, 18, 117, 217 from the connecting members 19 through the engaging portions 32, 33 without increasing the regions of the ribs 38. As a result, in this power storage device 10, the weights of the holding plates 17, 18, 117, 217 are reduced while a load applied to the power storage modules 12 by the holding plates 17, 18, 117, 217 holding the power storage modules 12 is secured.

In the holding plates 17, 18, 117, 217, the opposite ends of each of the first ribs 41, 61 are connected to the edge ribs 43, 83 disposed adjacently to two of the plurality of the engaging portions 32, 33, 34, 35. Thus, the plurality of the first ribs 41, 61 functions as the diagonal beams for the edge ribs 43, 83 formed along the edges 31*a*, 31*b*. The second ribs 42, 62 extend in the defined regions 51, 52, 53, 71, 72, 73, 74, 75 surrounded by the plurality of first ribs 41, 61, In this holding plates 17, 18, 117, a ratio of the area of the thin-walled portions 39 to the area of the ribs 38 as viewed in the stacking direction increases while securing the rigidities of the holding plates 17, 18, 117 against the load applied to the power to storage modules 12.

In the holding plates 17, 18, 117, 217, the plurality of first ribs 41, 61 forms the intersections 48, 68. The intersections 48, 68 are arranged in the direction that intersects the facing direction in which the edge 31*a* and the edge 31*b* face each other, between the edge 31*a* and the edge 31*b*. According to this configuration, the weights of the holding plates 17, 18, 117, 217 are reduced while the rigidity of the center of each of the holding plates 17, 18, 117, 217 is secured.

The holding plates 17, 18, 117, 217 each have a rectangular shape in which the edges 31*a*, 31*b* are the longer sides. Each of the plurality of engaging portions 32 is disposed in line with one of the plurality of engaging portions 33 in the facing direction in which the edge 31*a* and the edge 31*b* face each other, In this case, a load is equally applied to the holding plates 17, 18, 117, 217 in the long side direction, so that the holding plates 17, 18, 117, 217 are hardly bent even when receiving a force from the connecting members 19. Thus, even if the area of the ribs 38 as viewed in the stacking direction is reduced, the rigidity of the holding plates against the load applied to the power storage modules 12 is secured.

Each of the engaging portions 32, 33 has a through hole H1 or H2 that extends through each of the holding plates 17, 18, 117, 217 and with which one of the connecting members 19 is engaged, and the area of each of the plurality of thin-walled portions 39 is greater than that of one of the through holes H1, H2. In this case, segmentalization of the thin-walled portions 39 is suppressed, and easy molding of the holding plates 17, 18, 117, 217 is secured.

In the holding plates 17, 18, only the edge rib 43 of the plurality of ribs 38 is connected to the engaging portions 32*a*, 32*e*, 33*a*, 33*e* of the plurality of engaging portions 32, 33 positioned the closest to the ends of the edges 31*a*, 31*b*. The first ribs 41 are not connected to the engaging portions 32*a*, 32*e*, 33*a*, 33*e*. Since the holding plates 17, 18 each have the edge rib 43, the load applied to the power storage modules 12 may be secured even when the ribs 38 other than the edge rib 43 are not connected to the engaging portions 32*a*, 32*e*, 33*a*, 33*e* positioned the closest to the ends of the edges 31*a*, 31*b*. Since the ribs 38 other than the edge rib 43 are not connected to the engaging portions 32*a*, 32*e*, 33*a*, 33*e*, the weights of the holding plates 17, 18 are further reduced.

In the holding plates 17, 18, the area density of the thin-walled portions 39 in each of the defined regions 51, 53 is higher than the area density of the thin-walled portions 39 in the defined region 52. It is important to secure the rigidities of the centers of the holding plates 17, 18 for adequately holding the plurality of power storage modules 12. According to this configuration, the weights of the holding plates 17, 18 are reduced while the rigidities of the centers of the holding plates 17, 18 are secured.

In the holding plates 17, 18, the area density of the thin-walled portions 39 in the defined regions 54 is higher than the area density of the thin-walled portions 39 in the defined region 52. Since the holding plates 17, 18 each have the edge rib 43, the ribs 38 in the defined regions 54 less contribute to the rigidities of the holding plates 17, 18 than the ribs 38 in the defined region 52 do. Thus, the weights of the holding plates 17, 18 are further reduced while the rigidities of the holding plates 17, 18 against the load applied to the power storage modules 12 are secured.

In the defined regions 51, 52, 53 of the holding plates 17, 18, as viewed in the stacking direction, the area density of the thin-walled portions 39 in a first portion of the defined regions is higher than the area density of the thin-walled portions 39 in a second portion of the defined regions that is positioned closer, than the first portion, to the centers of the holding plates 17, 18 in the direction that intersects with the facing direction in which the edge 31a and the edge 31b face each other. According to this configuration, the weights of the holding plates 17, 18 are reduced while the rigidities of the holding plates 17, 18 are secured.

In the holding plates 17, 18, the edge rib 43 extends along the edges of the holding plates 17, 18. The corner ribs 45 are inclined to the edge 31a and the edge 31c. The corner ribs 45 extend so as to connect the edge rib 43 extending along the edge 31a and the edge rib 43 extending along the edge 31c. Thus, the holding plates 17, 18 are hardly bent even when receiving forces from is the connecting members 19. Therefore, the rigidities of the holding plates 17, 18 against the load applied to the power storage modules 12 are secured even when the area of the ribs 38 as viewed in the stacking direction is reduced.

In the holding plates 17, 18, the support ribs 46 are inclined to the facing direction and extend from the edge rib 43 to the first ribs 41 on straight lines connecting between the engaging portions 32, 33 outside the plurality of defined regions 51, 52, 53. In a case where the number of the first ribs 41 is large, the rigidity of each of the holding plates 17, 18 increases while the weight of each of the holding plates 17, 18 increases and the shape of each of the thin-walled portions 39 surrounded by the plurality of ribs 38 become fine, as compares with a case where the number of the first ribs 41 is small. When the shape of the thin-walled portions 39 is too fine, molding becomes difficult. The disposition of the above support ribs 46 achieves balance among increasing the rigidities of the holding plates 17, 18 against the load applied to the power storage modules 12, suppressing an increase of the weights of the holding plates 17, 18, and suppressing segmentalization of the thin-walled portions 39.

Although the embodiment and modification examples of the present invention have been described above, the present invention is not limited to the above-described embodiment, but may be modified in various manners without departing from the scope.

Although the configuration in which each of the pair of holding plates 17, 18 includes the plurality of ribs 38 and the plurality of thin-walled portions 39 has been described in the present embodiment, the present invention is not limited to the configuration. The plurality of ribs 38 and the plurality of thin-walled portions 39 may be formed in only one of the pair of holding plates 17, 18.

The number of the engaging portions 32, 33 in each of the holding plates 17, 18, 117, 217 may be less than five, or six or more. The number of the engaging portions 32, 33 in each of the holding plates 17, 18, 117, 217 may be at least two.

As has been described, the shaft portion of the bolt 19a is inserted through each of the through holes H1, H2 and the nut 19b is screwed onto the screw tip of the bolt 19a in the present embodiment. In this case, the inner peripheral surfaces of the through holes H1, H2 may be smooth, or a screw thread may be formed in the inner peripheral surfaces of the through holes H1, H2.

Although the configuration in which the bolts 19a are inserted through the through holes H1, H2 of the plurality of engaging portions 33a, 33b, 33c, 33d has been described in the above-embodiment, the present invention is not limited to the configuration. For example, the holding plate 18 may have holes that do not extend through the engaging portions 33a, 33b, 33c, 33d, formed in the main surface 18b, instead of the through holes H1, H2. In this case, the screw tips of the bolts 19a may be directly screwed into threads formed in the inner peripheral surfaces of the holes formed in the engaging portions 33a, 33b, 33c, 33d of the holding plate 18. In the present specification, "holes" include those that do not extend through the holding plates 17, 18.

REFERENCE SIGNS LIST 10 power storage device
12 power storage module
17, 18, 117, 217 holding plate
19 connecting member
31a, 31b, 31c, 31d edge
32, 33, 34, 35 engaging portion
38 rib
39 thin-walled portion
41, 61 first rib
42, 62 second rib
43, 83 edge rib
45 corner rib
46 support rib
48.68 intersection
51, 52, 53, 54, 71, 72, 73, 74, 75, 76 defined region
H1, H2 through hole

The invention claimed is:

1. A power storage device comprising:
a plurality of power storage modules that are stacked;
a pair of holding plates between which the plurality of power storage modules is held in a stacking direction; and
a plurality of connecting members connecting the pair of holding plates, and configured to apply a load to the plurality of power storage modules in the stacking direction through the pair of holding plates, wherein
each of the pair of holding plates has a first edge and a second edge that face each other, and has a plurality of first engaging portions arranged along the first edge and a plurality of second engaging portions arranged along the second edge, the plurality of first engaging portions with which some of the plurality of connecting members is engaged and the plurality of second engaging portions with which some of the plurality of connecting members is engaged, each of the plurality of first engaging portions being engaged with one of the plurality of connecting members, and each of the plurality of second engaging portions being engaged with one of the plurality of connecting members,
at least one of the pair of holding plates has a plurality of ribs, and a plurality of thin- walled portions defined by the plurality of ribs and having a thickness smaller than a thickness of each of the plurality of ribs in the stacking direction,
the plurality of ribs includes first edge ribs extending along the first edge and the second edge of the holding plates, a plurality of first ribs inclined to an extending direction of the first edge and an extending direction of the second edge and extending along straight lines connecting the first engaging portions and the second engaging portions, and a plurality of second ribs extending along a facing direction in which the first edge and the second edge face each other, each of the plurality of first ribs has opposite ends connected to the first edge ribs, respectively, at least two of the plurality of first ribs extend in different directions from each other and form an intersection where the at least two of the plurality of first ribs intersect with each other, and at least one of the plurality of second ribs has opposite ends connected to the plurality of first ribs intersecting with each other, each of the first engaging portions and each of the second engaging portions are provided at an outer side of the power storage modules in a direction perpendicular to the stacking direction.

2. The power storage device according to claim 1, wherein the plurality of first ribs is provided with a plurality of the intersections, and the plurality of intersections is arranged in a direction intersecting with the facing direction between the first edge and the second edge, as viewed in the stacking direction.

3. The power storage device according to claim 1, wherein each of the pair of holding plates has a rectangular shape, as viewed in the stacking direction, in which the first edge and the second edge parallel to each other are longer sides, and each of the plurality of first engaging portions is disposed in line with one of the plurality of second engaging portions in the facing direction in which the first edge and the second edge face each other.

4. The power storage device according to claim 1 wherein each of the plurality of first engaging portions and the plurality of second engaging portions has a hole that extends through each of the holding plates and with which one of the plurality of connecting members is engaged, and each of the plurality of thin-walled portions has an area greater than an area of the hole as viewed in the stacking direction.

5. The power storage device according to claim 1, wherein the plurality of second ribs is formed in a defined region surrounded by and defined by the plurality of first ribs.

6. The power storage device according to claim 5, wherein the plurality of second ribs is formed in each of a plurality of the defined regions, the plurality of defined regions includes a first region and a second region that is positioned closer to a center of each of the holding plates than the first region is in a direction that intersects with the facing direction, as viewed in the stacking direction, and an area density of the thin-walled portions in the first region is higher than an area density of the thin-walled portions in the second region.

7. The power storage device according to claim 5, wherein in the defined region, an area density of the thin-walled portions in a first portion in the defined region is higher than an area density of the thin-walled portions in a second portion that is positioned closer, than the first portion, to a center of each of the holding plates in the defined region in a direction intersecting with the facing direction.

8. The power storage device according to claim 1, wherein each of the pair of holding plates has a third edge and a fourth edge that intersect with the first edge and the second edge and extend in directions along each other, and has a third engaging portion arranged along the third edge and a fourth engaging portion arranged along the fourth edge, wherein the third engaging portion with which some of the plurality of connecting members is engaged and the fourth engaging portion with which some of the plurality of connecting members is engaged, the plurality of ribs includes second edge ribs extending along the third edge and the fourth edge of the holding plates, and a corner rib inclined to the first edge and the third edge, and the corner rib extends so as to connect the first edge rib extending along the first edge and the second edge rib extending along the third edge.

9. The power storage device according to claim 1, wherein the plurality of ribs includes a support rib inclined to the facing direction in which the first edge and the second edge face each other and extending on a straight line connecting one of the first engaging portions and one of the second engaging portions from the first edge rib to the first ribs.

* * * * *